Oct. 31, 1967  A. W. PARR  3,349,797
HOT AND COLD WATER CROSS-OVER FITTING
Filed Dec. 21, 1964  2 Sheets-Sheet 2

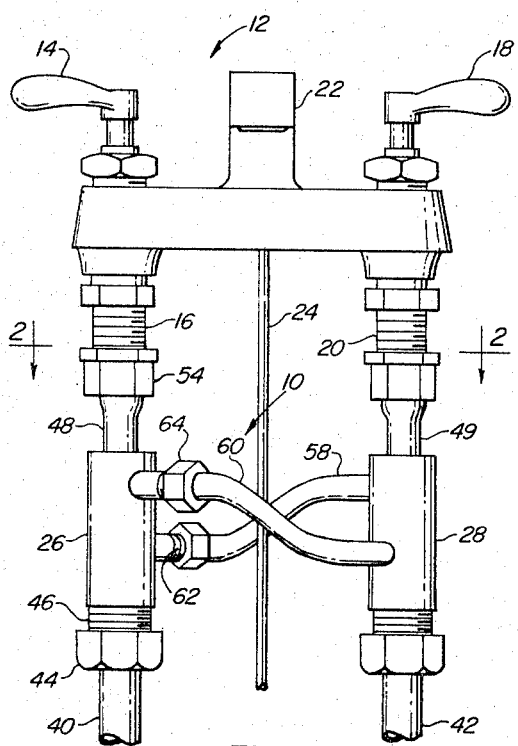

ALBERT W. PARR
INVENTOR
BY
BUCKHORN, BLORE, KLARQUIST & SPARKMAN
ATTORNEYS

United States Patent Office 3,349,797
Patented Oct. 31, 1967

3,349,797
HOT AND COLD WATER CROSS-OVER FITTING
Albert W. Parr, 4700 Meldrum Ave., Milwaukie, Oreg. 97222
Filed Dec. 21, 1964, Ser. No. 419,735
6 Claims. (Cl. 137—594)

The present invention relates to a hot and cold water cross-over fitting for plumbing fixtures, and more particularly to such a fitting adapted for installation immediately adjacent a hot and cold water faucet.

Often in buildings in which there are two or more lavatories or other rooms on one floor each requiring hot and cold water faucets, such rooms adjoin one another, and the hot and cold water fixtures of each room are situated back-to-back on opposite sides of a common wall. In such instances a single pair of vertical hot and cold water riser pipes within the wall usually supply both faucet fixtures. Better plumbing practice requires that the hot and cold water control handles of each plumbing fixture always be on the same relative side of the sink or other receptacle, that is, the hot water handle should be on the left and the cold water handle on the right side thereof. However, when two back-to-back faucet fixtures are supplied by common riser pipes between the fixtures, one of the fixtures will have the hot and cold water supplied to it on the wrong side thereof unless a cross-over connection is provided in the lines somewhere between the faucet fixture and the riser supply pipes.

It is common practice for the plumber to fashion such a cross-over connection within the wall between the faucets during initial installation of the plumbing, using standard pipe and pipe couplings. Obviously this is laborious and time-consuming, and the cross-over connection usually must be made during initial stages of construction of the building in order to prevent tearing out sections of the partition wall. Moreover, when repairs are required, a portion of the finished wall must be torn away to gain access to the connection.

While it has been previously suggested to provide a special cross-over fitting for installation within a partition wall at the point where lateral takeoff lines would normally be coupled to the supply lines, such previous fittings have been unnecessarily complex and expensive to produce and difficult to install, and they do not avoid the problem of tearing out a portion of a wall when repairs are necessary.

Accordingly, a primary object of the present invention is to provide a new and improved hot and cold water cross-over fitting especially suited for installation exteriorly of the wall within which the supply pipes are situated and immediately adjacent a faucet fixture.

Another object is to provide a cross-over fitting which is simple and compact in construction for installation out of sight beneath a wash basin or other receptacle.

Another object is to provide a cross-over fitting which is inexpensive to manufacture and easy to install in existing building units as well as in new units, without requiring access to the interior of the wall on which the plumbing fixture is mounted.

In furtherance of the above objects, an illustrated embodiment of the present cross-over fitting includes a pair of cylindrical body members each having an axial outlet opening in its upper end and an axial intake opening in its lower end, with the upper and lower openings being separated from one another by an interior partition or wall. Each body member also has a pair of lateral openings, including an upper one intersecting the upper axial opening and a lower one intersecting the lower axial opening. The two body members are joined together by a pair of cross-over tubes, one extending from the lower lateral opening of one body member to the upper lateral opening of the other body member, and the other tube extending from the upper lateral opening of the one body member to the lower lateral opening of the other body member. A pair of outlet pipe sections extend upwardly from the upper axial openings of the body portion. Suitable coupling means are provided at the lower ends of the body members and at the upper ends of the outlet pipe sections to enable ready installation of the fitting to a pair of supply pipes below the fitting and to a faucet fixture above the fitting. Thus hot water entering the fitting through the inlet opening of the right-hand body member will flow out of the fitting from the outlet opening and pipe of the left-hand body member, while the relative position of the cold water flow will be similarly reversed.

The above and other objects will be readily apparent from the following description which proceeds with reference to the accompanying drawings, wherein:

FIG. 1 is an elevational view of a cross-over fitting in accordance with the present invention connected to a combined hot and cold water faucet fixture, and to hot and cold water supply lines;

FIG. 2 is a sectional view taken along the line 2—2 of FIG. 1 showing the cross-over fitting in plan;

FIG. 3 is an enlarged sectional view taken along the line 3—3 of FIG. 2 showing the interior of the left-hand side of the cross-over fitting;

FIG. 4 is a view similar to that of FIG. 3 showing a modification in accordance with the invention.

Figure 5:
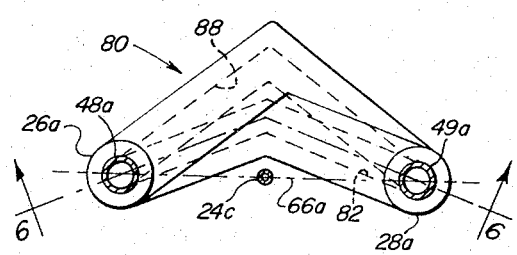
FIGS. 5 and 6 are sectional views showing a further modification in accordance with the invention.

With reference to the drawing, the illustrated cross-over fitting 10 is shown in FIG. 1 connected to a standard faucet fixture 12 such as is commonly installed on a lavatory wash basin. The faucet fixture includes a hot water valve handle 14 on the left side of the unit for opening and closing a shut-off valve (not shown) within a hot water intake pipe 16, and a cold water valve handle 18 on the right side of the unit which functions in the same manner as the handle 14 for actuating another valve (not shown) within a cold water intake pipe 20. The hot and cold water intake conduits 16 and 20 merge within the interior of the faucet unit to discharge water through a common discharge nozzle 22 positioned midway between the two valve handles. A drainplug-actuating rod 24 extends downwardly from the main body of the faucet, and is actuated by a knob (not shown) behind the nozzle 22.

The cross-over fitting itself includes a pair of cylindrical distribution body members 26, 28, each including an axial intake opening 30 in the lower end thereof defining an intake chamber and an axial outlet opening 32 in the upper end thereof defining a discharge chamber. The upper and lower axial openings are separated from one another by an interior wall portion 34 of the body. Each body member is also provided with a pair of lateral openings, including a lower lateral opening 36 in communication with the intake opening 30 and an upper lateral opening 38 in communication with the outlet opening 32.

Extending partly within the intake openings 30 of the body members 26, 28 are the upper ends of cold and hot water supply lines 40 and 42, respectively. The upper end portion of each supply line carries a half slip nut 44 and ring seal 45, and the lower end portion 46 of each body member is threaded for receiving such nut and thus forming a fluid-tight connection with the supply line.

A pair of upwardly extending outlet pipe, or conduit, sections 48, 49 extend at their lower ends partly within the upper axial openings 32 of the body members 26, 28, respectively. The enlarged upper end of each outlet section defines a shoulder 50 and rounded head portion 52 shaped to fit partly within the end of one of the intake conduits 16, 20 of the faucet unit. Each outlet pipe section carries a slip nut 54 whose threads mate with the external threads on the lower ends of the intake conduits 16, 20 of the faucet to provide a union connection with the latter. The nut 54 is provided with an inwardly extending annular flange 56 which abuts against the shoulder 50 of the outlet pipe when the nut is threaded onto an intake conduit of the faucet to draw the associated outlet pipe into firm engagement with the faucet intake conduit.

Referring to FIGS. 1 and 2, a pair of cross-over tubes, or conduits, 58, 60 connect together the two laterally opposed body members 26, 28. More specifically, one end of the cross-over tube 58 extends within the lower lateral opening 36 of the left-hand body member 26, and the other end of the same tube extends within the upper lateral opening 38 of the right-hand body member 28. The corresponding ends of the other cross-over tube 60 extend, respectively, into the upper lateral opening 38 of the left-hand body member 26 and into the lower lateral opening 36 of the right-hand body member 28. Thus it will be apparent that water flowing into the fitting through either one of the intake openings will flow out of the fitting through the opposite one of the outlet openings and conduits.

The cross-over lines 58, 60 may be made of any suitable material such as, for example, copper or other metal tubing. Depending on the material used, the ends of the cross-over lines may be soldered, brazed, threaded or otherwise held within the lateral openings of the distribution members to provide a water-tight connection. The intake and outlet pipe sections may be joined to the body members in a similar fashion. Each illustrated cross-over line 58, 60 is constructed in two sections as shown in FIGS. 1 and 2. The shorter section of each cross-over line is threaded as at 62 and the other, longer section carries a slip nut 64 for threadedly connecting the two sections together. The cross-over lines may, of course, be constructed in one piece if desired, in which case the opposite ends of the tubing 58, 60 would be brazed, soldered or otherwise connected directly to the body members. The jointed cross-over lines do, however, provide a means whereby the left- and right-hand portions of each unit may be stored separately, and whereby the opposite sides of different fittings can be made with cross-over sections of different lengths so that fittings having any desired spacing between the opposite body members could be made up as required for any given installation.

As will be evident from FIGS. 1 and 2, both cross-over lines 58, 60 are curved, both in a vertical plane and in a horizontal plane, with the lines crossing one another only in the vertical plane. As viewed in a horizontal plane, the lateral openings 36, 38 of each body member are offset one from the other on opposite sides of a vertical center plane 66 extending between the body members, with the upper lateral opening 38 on the left-hand body member being disposed on the same side of the center plane as the lower lateral opening 36 in the right-hand body member. Thus the cross-over line 60 extending from the upper lateral opening of the left-hand body member to the lower lateral opening of the right-hand body member is disposed on an opposite side of the center plane 66 from the other cross-over line 58. Also, since the cross-over lines are curved outwardly away from one another and away from the center plane 66 as viewed in a horizontal plane (FIG. 2), the lines define a central opening therebetween through which the drainplug-actuating rod 24 of the faucet unit, or any other necessary piping, can extend as required.

It will be noted that in the illustrated embodiment of the invention, the parts making up the left- and right-hand side of the fitting are duplicates of one another, that is, the two outlet pipe sections 48 and 49 are identical, and the body members 26 and 28 are identical also, with each body member being oriented upside down relative to the other one, with the lateral openings of each facing the same openings of the other. The illustrated cross-over tubes are also identical and interchangeable, one being installed upside down with respect to the other.

In the usual installation, the hot and cold water supply lines (not shown) will extend upwardly toward the faucet fixture on the wrong side, that is, with the cold water line on the left and the hot water line on the right-hand side of the fixture. With the present cross-over fitting interposed between the supply lines and the faucet, the relative positions of the hot and cold water lines will be reversed. Specifically, cold water will enter the intake opening 30 of the left-hand body member 26 and flow through the cross-over line 58 to the outlet opening 32 of the right-hand body member 28, from which it will pass into the outlet pipe 49 and then into the right-hand intake conduit 20 of the faucet so as to be regulated by the proper, right-hand faucet handle 18. Similarly, hot water will flow into the intake opening of the right-hand body member 28 and out through the left-hand outlet pipe 48 into the left-hand intake condut 16 of the faucet.

FIG. 4 illustrates a modified form of cross-over fitting having cylindrical left- and right-hand body members (not shown) of the same construction as the corresponding body members 26, 28 of the previously described embodiment and a pair of outlet pipes (not shown), including slip nuts 54a, of the same construction as the corresponding pipes 48, 49 of the previous embodiment. The body members are joined together by a single unitary cross-over portion 70 provided with a pair of cross-over passages, or conduits, including a conduit 72 extending from the lower lateral opening of the left-hand body member to the upper lateral opening of the right-hand body member, and a conduit 74 extending from the upper lateral opening of the left-hand body member to the lower lateral opening of the right-hand body member. The cross-over unit 70 may be made as, for example, by die casting. Each passage of the unit preferably extends in straight lines from the opposite body members to intersect at an angle $a$ midway between the two body members so that the cross-over passages can easily be formed either by cores during the casting process or by drilling thereafter. The unit is provided with a central opening 76 through which a drain-actuating rod 24a of a faucet unit may extend. Thus the cross-over unit 70 functions in the same manner as the pair of cross-over tubes 58, 60 of the fitting of FIG. 1 to reverse the paths of hot and cold water flowing therethrough to a faucet fixture.

Figure 6:
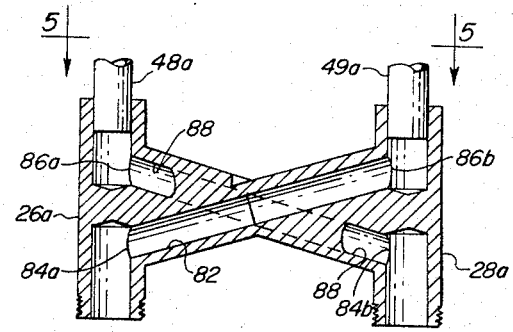

FIGS. 5 and 6 illustrate another modified form of cross-over fitting having cylindrical body members 26a and 28a similar to the corresponding members 26 and 28 of the FIG. 1 embodiment except that the members 26a and 28a are cast integrally with a cross-over portion 80 joining such members. Those portions of the FIG. 5 embodiment not shown are identical to corresponding components of the FIG. 1 embodiment and include outlet pipes 48a and 49a which extend within the upper ends of the body members 26a and 28a and have union couplings (not shown) at their upper ends.

The unitary cross-over portion 80 includes a pair of separate cross-over passages, or conduit portions, including a first conduit portion 82 extending from a lower lateral opening 84a in the left-hand body member 26a to an upper lateral opening 86b in the right-hand body member 28a and a second conduit portion 88 extending from an upper lateral opening 86a in the left-hand body member to the lower lateral opening 84b in the right-hand body member. The primary difference between the previous embodiments and the embodiment of FIG. 5 is that in the latter the cross-over portion 80 is formed so that both conduit portions 82 and 88 extend on the same side of a vertical median plane 66a through the axes of the body members. More specifically, both conduit portions pass behind the vertical drain-actuating rod 24c, thus avoiding obstructions that are sometimes present underneath the front portion of a basin to which the cross-over fixture is joined. With reference to FIG. 5, both conduit portions are angular and change direction abruptly midway between the two body members. Both conduit portions angle outwardly away from the center plane 66a proceeding from the left-hand body member to the midpoint between body members and then angle inwardly toward the center plane proceeding from the midpoint to the right-hand body member. Proceeding in the same direction, the initially upper conduit 88 passes underneath the conduit 82 at the midpoint between body members.

From the foregoing it will be evident that the modification of FIG. 5 functions in the same manner as the other embodiments to reverse the flow paths of hot and cold water flowing upwardly therethrough.

The illustrated embodiments could, of course, be modified as required so as to adapt them to different installations. For example, the outlet pipe sections could consist of elbow or T members.

Having illustrated and described a preferred embodiment of the invention, it should be apparent to those skilled in the art that the invention permits of modification in arrangement and detail. I claim as my invention all such modifications as come within the true spirit and scope of the appended claims.

I claim:

1. A hot and cold water cross-over fitting comprising:
   a pair of laterally spaced distribution body members,
   each of said body members including a single intake opening at one end thereof and a single outlet opening at the other end thereof,
   wall means within each member separating said intake opening from said outlet opening,
   each of said body members being provided with a first lateral opening in communication with said intake opening,
   and a second lateral opening in communication with said outlet opening,
   a pair of cross-over pipes extending between said body members and connecting together the same,
   one of said cross-over pipes extending from the first lateral opening of one of said body members to the second lateral opening of the other of said body members,
   the other said cross-over pipe extending from the second lateral opening of said one body member to the first lateral opening of said other body member,
   said body members and said pipes being otherwise imperforate so that fluid flowing into the intake opening of one of said body members will be discharged through the outlet opening of the other said body member.

2. A hot and cold water cross-over fitting according to claim 1 comprising:
   male threaded coupling means at the intake opening ends of said body members for connecting said intake openings to hot and cold water supply lines, and union coupling means at the outlet opening ends of said outlet conduit sections for connecting said outlet openings directly to the intake portions of a faucet fixture.

3. A hot and cold water cross-over fitting according to claim 1 wherein:
   each said body member is cylindrical in form,
   said intake and outlet openings in each said body member comprise a pair of axial openings one in each of opposite ends of said member,
   and said lateral openings in each said body member are laterally offset one from the other on opposite sides of the center plane between said body members.

4. A hot and cold water cross-over fitting according to claim 1 wherein said lateral openings in each said body member are laterally offset on the same side of the center plane between said body members.

5. A hot and cold water cross-over fitting according to claim 1 including coupling means at said one end of each said body member for connecting said intake openings to hot and cold water supply pipes,
   a portion adjacent said other end of each said body member defining an outlet conduit section of lesser outside diameter than the remainder of said body member and having an enlarged head portion at said other end,
   and union coupling means at the outlet ends of said outlet conduit sections in association with said enlarged head portions for connecting said outlet ends to tail pieces of a faucet fixture.

6. A hot and cold water cross-over fitting according to claim 1 for installation outside a partition wall and beneath a faucet fixture and for connection directly to said fixture wherein:
   said body members are cylindrical and identical but oppositely disposed for vertical disposition beneath a faucet fixture when installed,
   said intake opening for each body member extends axially into the lower end of said body member,
   said outlet opening for each body member extends axially into the upper end of said body member,
   the lateral opening of each body member in communication with the outlet opening thereof is spaced above and is laterally offset from the other lateral opening of the same said body member,
   said cross-over pipes are separated from one another with one of said pipes extending from the lower lateral opening of one said body member to the upper lateral opening of the other said body member, and with the other of said pipes extending from the upper lateral opening of said one body member to the lower lateral opening of said other body member,
   said cross-over pipes are bowed away from one another horizontally so as to provide at least a slight gap therebetween intermediate the opposite ends thereof,
   an upper portion of each said body member is of reduced outside diameter and has at said upper end an enlarged head portion,
   an internally threaded nut member is slidable on each said reduced body portion between said head portion and the remainder of said body member for providing a union coupling for said faucet fixture,
   the lower end portion of each said body member is externally threaded for connection to a supply pipe.

References Cited

UNITED STATES PATENTS

| | | | |
|---|---|---|---|
| 1,762,619 | 6/1930 | Fleming | 4—167 |
| 2,439,712 | 4/1948 | Brady | 285—132 |
| 2,538,835 | 1/1951 | Harvey et al. | 137—604 X |
| 2,581,855 | 1/1952 | Griffith | 137—606 X |
| 2,878,489 | 3/1959 | Graham | 4—192 |

M. CARY NELSON, *Primary Examiner.*

H. T. KLINKSIEK, *Assistant Examiner.*